United States Patent [19]
Falbel

[11] 3,990,201
[45] Nov. 9, 1976

[54] EVACUATED DUAL GLAZING SYSTEM

[76] Inventor: Gerald Falbel, 472 Westover Road, Stamford, Conn. 06902

[22] Filed: Sept. 3, 1974

[21] Appl. No.: 502,567

[52] U.S. Cl. .................................. 52/171; 52/616; 165/96
[51] Int. Cl.² ........................................ B61D 17/12
[58] Field of Search ...................... 52/171, 172, 616; 165/96

[56] References Cited
UNITED STATES PATENTS

| | | | |
|---|---|---|---|
| 2,216,332 | 10/1940 | Wahl | 52/171 |
| 3,167,159 | 1/1965 | Bovenkerk | 165/96 |
| 3,270,802 | 9/1966 | Lindberg | 165/96 |
| 3,710,074 | 1/1973 | Stewart | 52/171 |

FOREIGN PATENTS OR APPLICATIONS

| | | | |
|---|---|---|---|
| 665,827 | 7/1965 | Belgium | 52/171 |
| 1,000,869 | 3/1962 | United Kingdom | 52/171 |

Primary Examiner—Albert W. Davis, Jr.
Assistant Examiner—James D. Liles
Attorney, Agent, or Firm—Joseph Levinson

[57] ABSTRACT

An evacuated dual pane window structure is provided for reducing heat loss through the window structure. The window structure comprises a pair of closely spaced panes of glass having a spacing of less than 0.25 inch with a spacer means positioned between and uniformly spaced in the area between the panes, and sealing means such as an O-ring positioned around the perimeter and between the panes of glass. A vacuum pump may be provided for evacuating the area between the panes of glass for reducing thermal losses through the window structure. Reflective coatings may be provided on the inside surfaces of the glass. A plurality of windows of the above structure may be connected by manifold piping to a single vacuum pump which is actuated by a thermostat when a preset temperature differential exists between the outside and the inside of the building where the windows are used. In an alternate embodiment of low-emissivity layer of polyester film is provided with a reflective coating and mounted between the panes of glass and the spacers positioned therebetween.

1 Claim, 4 Drawing Figures

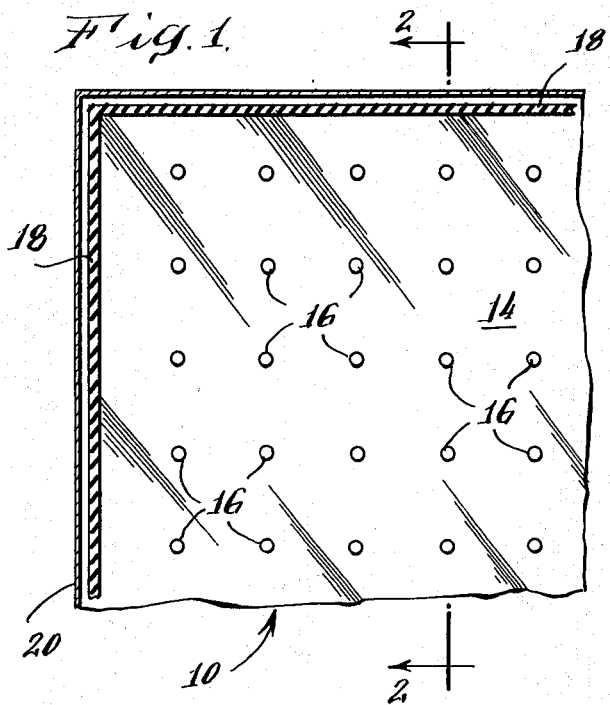
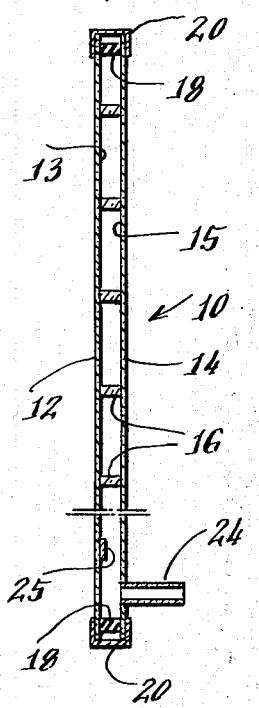
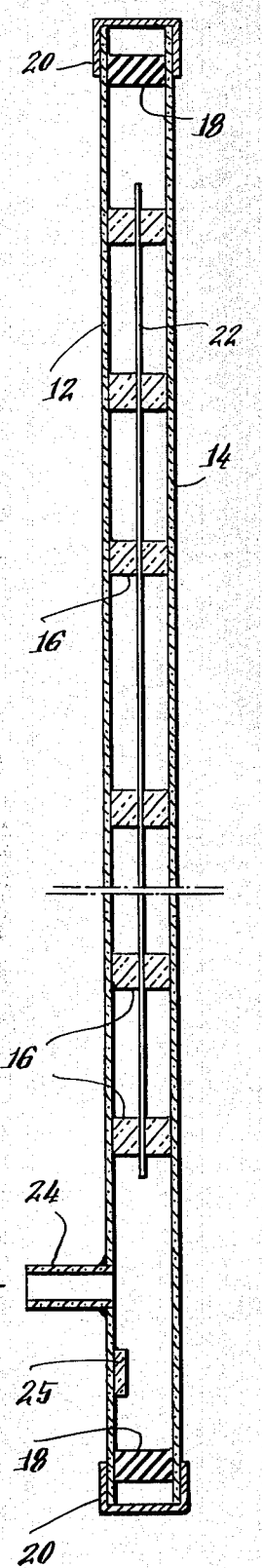
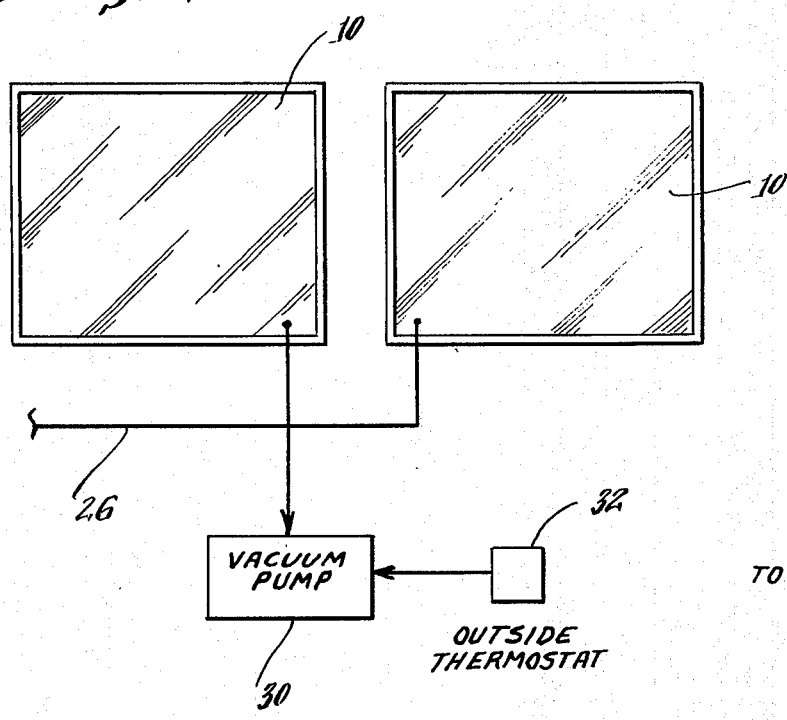

EVACUATED DUAL GLAZING SYSTEM

BACKGROUND OF THE INVENTION

This invention relates to an evacuated dual glazing system and more particularly to an evacuated dual pane window structure for greatly reducing the thermal losses therethrough.

The recent energy crisis has produced world-wide concern with respect to the shortage of raw materials, and particularly with respect to the shortage of fuels. With each passing year this shortage will undoubtedly grow more acute, with increasing world industrialization. Increasing use and shortages will of course produce commensurate increases in cost of all fuels. This fact, plus the environmental constraints on unlimited expansion of electric power generating capability will force architects and building contractors to find and employ better ways for reducing heat loss in future construction.

It is well known that a major component of the total heat loss in building construction is through the windows, and this is the predominant effect of the glass-box skyscrapers which exist in the major cities around the world. Among the ways of reducing the heat loss through windows is to use multiple panes of glass, for example storm windows in addition to the regular windows, or dual glazing of the type sold under the trademark Thermopane windows. Obviously, the losses could be reduced even further by using three, four, or many more multiple layers of spaced glass panes. This becomes expensive and impractical. Another way to reduce the heat loss in a dual glazing system would be to evacuate the space between the glass panes. However, this cannot be done with present construction techniques because the glass of any reasonable pane size would immediately fracture due to atmospheric pressure, and even if thicker glass were used which could withstand the atmospheric pressure, such a construction would be extremely dangerous. The accidental breakage of one pane of the glass would cause a violent implosion, throwing glass fragments in all directions and being capable of causing serious injury or death to any person in the vicinity. This effect might be likened to that of the evacuated cathode ray tubes in television sets, in which implosion warnings are posted and special provisions are made in the form of implosion barriers to prevent injury to viewers in the case of the fracturing of the cathode ray tube.

Accordingly, it is an object of the present invention to provide a new and improved dual glazing system which substantially reduces the heat loss therethrough.

Another object of this invention is to provide a new and improved evacuated dual pane window structure which eliminates the danger of flying glass in the event of a fracture of one pane of the window.

A further object of this invention is to provide a new and improved evacuated dual pane window structure in which a single vacuum pump and control may be utilized for evacuating a plurality of windows in accordance with the window structure embodied in this invention.

SUMMARY OF THE INVENTION

In carrying out this invention in one illustrative embodiment thereof, an evacuated dual pane window structure is provided having a pair of closely spaced panes of glass having spacer means positioned therebetween and uniformly spaced in the area between the panes of glass. A sealing means is positioned around the perimeter and between the pair of closely spaced panes of glass for sealing the area between the panes, and means are provided for evacuating the area between the panes of glass for reducing the thermal losses through the window structure. The inside surfaces of the panes of glass are preferably provided with reflective coatings thereon.

BRIEF DESCRIPTION OF THE DRAWINGS

FIG. 1 is a partial front elevational view of the evacuated dual pane window structure embodied in the present invention.

FIG. 2 is a cross-sectional view of the evacuated dual pane window structure taken along line 2—2 of FIG. 1.

FIG. 3 is a partial side elevational view of another embodiment of the dual pane window structure in accordance with the present invention.

FIG. 4 is a diagram illustrated in block form of an evacuated dual glazing window structure employing a plurality of windows which are evacuated and controlled by a single vacuum pump and thermostat.

DESCRIPTION OF THE PREFERRED EMBODIMENT

Referring now to FIGS. 1 an 2, an evacuated dual pane window structure referred to generally with the reference character 10 has a pair of spaced panes of glass 12 and 14, separated by insulated spacers 16 positioned therebetween. Although the spacing will depend on the thickness and the type of glass employed, a spacing of less than 0.25 inch, and preferably less, is required. By greatly reducing the distance between the panes of glass, the velocity imparted to the glass in the event of an implosion caused by the breakage of one glass pane is greatly reduced. The spacers 16, which may be of a suitable insulating material having a high compressive strength, such as mica, are positioned between the glass panes 12 and 14 and spaced in a checkerboard fashion one inch apart. By placing the spacers every square inch between the panes 12 and 14, the mechanical bending stresses on the glass panes due to atmospheric pressure are greatly reduced, as is any visual distortion or pin-cushion effect due to the glass curvature generated by the inward atmospheric pressure. A suitable sealing means 18, for example an O-ring, is positioned around the outer perimeter of the window structure 10 between the closely spaced panes 12 and 14 for sealing the area between the panes of glass 12 and 14. The window 10 is mounted in a U-shaped or other suitable frame member 20. An opening 24 is provided for access to the area between the panes of glass 12 and 14, which is connected to a suitable vacuum pump for evacuating the window structure 10. The panes of glass 12 and 14 are provided with suitable reflective coatings 13 and 15, respectively. The reflective coatings may be in the form of conventional aluminized coatings, or preferably a dielectric coating which has high visible transmission combined with high reflectivity in the infrared region from 3 to 30 micrometers, e.g. tin oxide.

As mentioned above, the close spacing does not allow broken pieces of glass to develop any significant kinetic energy due to the inrush of air in the event of fracture of one of the panes. Assuming a space of 0.03 inch, a pressure of $P_1$ within the 0.03 inch space will decay to $0.5 \times P_1$ for a movement of one pane of glass of only 0.03 inch. The normal spacing of 0.62 inch between two panes of a Thermopane window requires 20 times larger movement of one pane of glass to achieve an equivalent pressure reduction. Accordingly, by the close spacing utilized in the present application, the threat is eliminated of flying glass in the event of an accidental breakage of one pane of the glass. Of course, by providing the spacers 16 every square inch between the panes 12 and 14, the mechanical stresses on the panes of glass due to the atmospheric pressure are also greatly reduced.

A discussion now follows of the performance of the window structure 10 with respect to thermal losses. A single pane of glass using standard conditions of thermal loss measurement loses 1.1 Btu/hr-°F-ft$^2$. Under the same conditions, a "Thermopane" window has a thermal loss of 0.55 Btu/hr-°F-ft$^2$, which is approximately 8 times larger than the heat loss in a normal 4 inches thick fiberglass insulated wall. The aim of the present invention is to reduce the thermal loss of the evacuated window 10 to the same as, or less than, the heat loss of a normal 4 inches thick insulated wall.

In order to achieve this thermal loss capability, reductions must be made in the two heat loss contributors, namely radiation and conduction. Conversely, assuming that the uncoated panes of glass 12 and 14 have an emissivity of 1.0 in the infrared and that the outside pane assumes the outside air temperature, then two uncoated glass panes with no conduction loss, separated by a vacuum, will have a loss of 1 But/hr-°F-ft$^2$. It is desirable to reduce this component to less then 0.01 Btu/hr-°F-ft$^2$, thus leaving the predominent heat loss for conduction of the spacers. This is achieved by partially aluminizing the inside surfaces 13 and 15 of the panes of glass 12 and 14 so that they each have a visible transmittance of 15%. Of course, by using the aluminized coatings 13 and 15, the visible transmission through the window 10 is reduced to the order of 10%. However, this is desirable in air-conditioned buildings, since it minimizes the heating effect of the sun's visible rays and thereby decreases the load on the air conditioning. Where high visible transmittance is desirable, such as in using the windows for solar heating or solar collector covers, dielectric coatings could be utilized, which are more transparent in the visible but highly reflective in the infrared.

A partially aluminized surface with a transmission of 15% and a reflectivity of 85% in the visible region has a transmission in the infrared region of less than 1%, and the infrared emissivity is therefore on the order of 5%. The resulting radiation transfer is $0.05 \times 0.05 \times 1$ Btu/hr-°F-ft$^2$, or 0.003 Btu/hr-°F-ft$^2$.

The second component of thermal loss, namely conduction, can be minimized by minimizing the cross-sectional area of the spacers between the panes 12 and 14, or by increasing the spacing between the panes, based on the implosion damage as a function of pane spacing. As a typical design, let us assume a spacing of 0.03 inch between the panes, and 0.022 inch × 0.022 inch dimensions of the spacers, resulting in a $0.5 \times 10^{-3}$ sq. in. cross-sectional area for each spacer. These small spacers will be essentially invisible at reasonable distances.

A mica spacer 16 has a thermal conductivity of 4.8 Btu/hr-°F-ft$^2$-inch. Therefore, since there are 144 such spacers per square foot of glass, if it is assumed the glass is a perfect conductor, the thermal conductive loss for the system will be 0.072 Btu/hr-°F-ft$^2$. By taking into account the fact that the glass is a very good insulator and performing the required spatial integration of the thermal conductivity equation for the system, it can be readily shown that the net conductive loss of the system will approach 0.05 Btu/hr-°F-ft$^2$. In this way, by combining the conductive and radiative losses, the desired thermal loss of 0.053 Btu/hr-°F-ft$^2$ is achieved.

The resulting compressive stresses on the mica spacers 16 are 28,000 psi, which is about one third the mica capability for compressive strength. The extreme fiber tensile stresses in the glass, assuming a ⅛inch thick glass pane, have also been calculated, and are on the order of 100 psi, which is well within the stress capabilities of normal window glass. For ¼ inch thick or tempered glass, the safety factor would of course be increased even further.

An esthetic disadvantage of the structure shown in FIG. 2 is the visible "pincushion" effect produced by the slight bending of the reflective glass surfaces when the inside space is evacuated as a result of the air pressure on the glass in the span between the spacers. This can be overcome by a modified and in some cases preferable configuration shown in FIG. 3, in which the two panes of glass 12 and 14 are uncoated, and the low emissivity layer is achieved by a layer 22 situated between the two panes 12 and 14 in the evacuated space therebetween. The layer 22 is an insulating layer of suitable material, such as glass or plastic, for example of polyester film equivalent to the type sold under the trade mark "MYLAR," which is partially aluminized on one or preferably both sides. In this configuration the spacers 16 are attached to the film 22, and the film 22 is stretched between the two panes of glass 12 and 14 until it becomes a flat surface. Under evacuation the film 12 sees no pressure and retains its plane surface. The pincushion effect on the outer panes 12 and 14 is much less apparent because of the low reflectivity of the outer panes.

FIG. 4 illustrates a plurality of window structures 10 in accordance with the present invention connected through manifold piping 26 to a central vacuum pump 30. The vacuum pump 30 is controlled by a thermostat 32 which would energize the pump 30 only when a preset temperature difference between the outside and the inside of the building is exceeded. In this way, a major loss of heat would be prevented with only a small expenditure of energy required to run the vacuum pump. When the pump is not running, a desiccant 25, e.g. silica gel, situated between the panes, prevents water condensation. The desiccant is revitalized whenever the vacuum pump is on. It will also be apparent that the evacuated space between the panes could be hermetically sealed, baked out, and gettered to maintain a vacuum for long periods of time, thereby eliminating the requirement for the vacuum pump.

The evacuated dual pane window structure embodied in this invention greatly reduces thermal loss through such windows, and overcomes the problems associated with attempting to evacuate the space in a dual glazed structure. The present invention results in a major reduction in heat loss through windows over that presently attainable in dual glazed systems without resorting to additional panes of glass.

Since other modifications and changes, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

I claim:
1. An evacuated dual panel window structure for reducing heat loss and pincushion effect through the window structure comprising, in combination,
   a. a window having a pair of closely spaced panes of glass with the spacing between said spaced panes of glass being less than 0.25 inch,
   b. a layer of transparent insulating material having an infrared reflective coating on at least one surface thereof,
   c. spacer means of insulating material positioned in alignment on both sides of said layer of transparent insulating material, said spacer means being uniformly spaced in the area at approximately one square inch intervals between said panes of glass for positioning said layer of insulating material between said spaced panes of glass as well as reducing stress on the window structure due to atmospheric pressure,
   d. sealing means positioned around the outer perimeter and between said pair of closely spaced panes of glass for sealing the area between said panes of glass, and
   e. means for evacuating the area between said panes of glass for reducing the thermal losses through said window structure.

* * * * *